United States Patent [19]

Munde et al.

[11] Patent Number: 4,556,331

[45] Date of Patent: Dec. 3, 1985

[54] SUSPENSION DEVICE FOR ROTARY SPINDLE

[75] Inventors: Jan C. Munde, Gnesta; Karl Laigar, Bandhagen, both of Sweden

[73] Assignee: Alfa-Laval Separation AB, Tumba, Sweden

[21] Appl. No.: 600,375

[22] Filed: Apr. 16, 1984

[30] Foreign Application Priority Data

Apr. 22, 1983 [SE] Sweden ................................ 8302301

[51] Int. Cl.⁴ .............................................. F16C 27/04
[52] U.S. Cl. .................................... 384/453; 384/536; 384/611
[58] Field of Search ................. 384/192, 215, 452–455, 384/495, 535, 536, 558, 581, 582, 611, 612, 620

[56] References Cited

U.S. PATENT DOCUMENTS

| | | | |
|---|---|---|---|
| 1,510,303 | 9/1924 | Bugatti | 384/535 |
| 2,487,343 | 11/1949 | Kopf | 384/535 |
| 2,530,323 | 11/1950 | Boyd | 384/611 |
| 2,551,621 | 5/1951 | Michelsen | 384/536 |
| 2,556,317 | 6/1951 | Cook | 384/535 |
| 3,516,717 | 6/1970 | Peterson | 384/517 |
| 4,109,977 | 8/1978 | Staphan | 384/582 X |

Primary Examiner—Stuart S. Levy
Assistant Examiner—David Werner
Attorney, Agent, or Firm—Cyrus S. Hapgood

[57] ABSTRACT

In a suspension device for a rotatable spindle (1) comprising a bearing housing which encloses two closely adjacent bearings—one radial bearing (3) and one axial bearing (4)—the bearing housing is divided in two parts (7, 8) each enclosing one of the two bearings (3, 4). First spring means (13, 14) are arranged between the frame and the bearing housing part (7) for the radial bearing (3), and second spring means (16) are arranged between the frame and the bearing housing part (8) for the axial bearing (4). The bearing housing parts (7, 8) are free to perform angular movements relative to each other around axes perpendicular to the spindle (1) but engage with each other so that they are prevented from moving relative to each other in the peripheral direction of the spindle.

6 Claims, 1 Drawing Figure

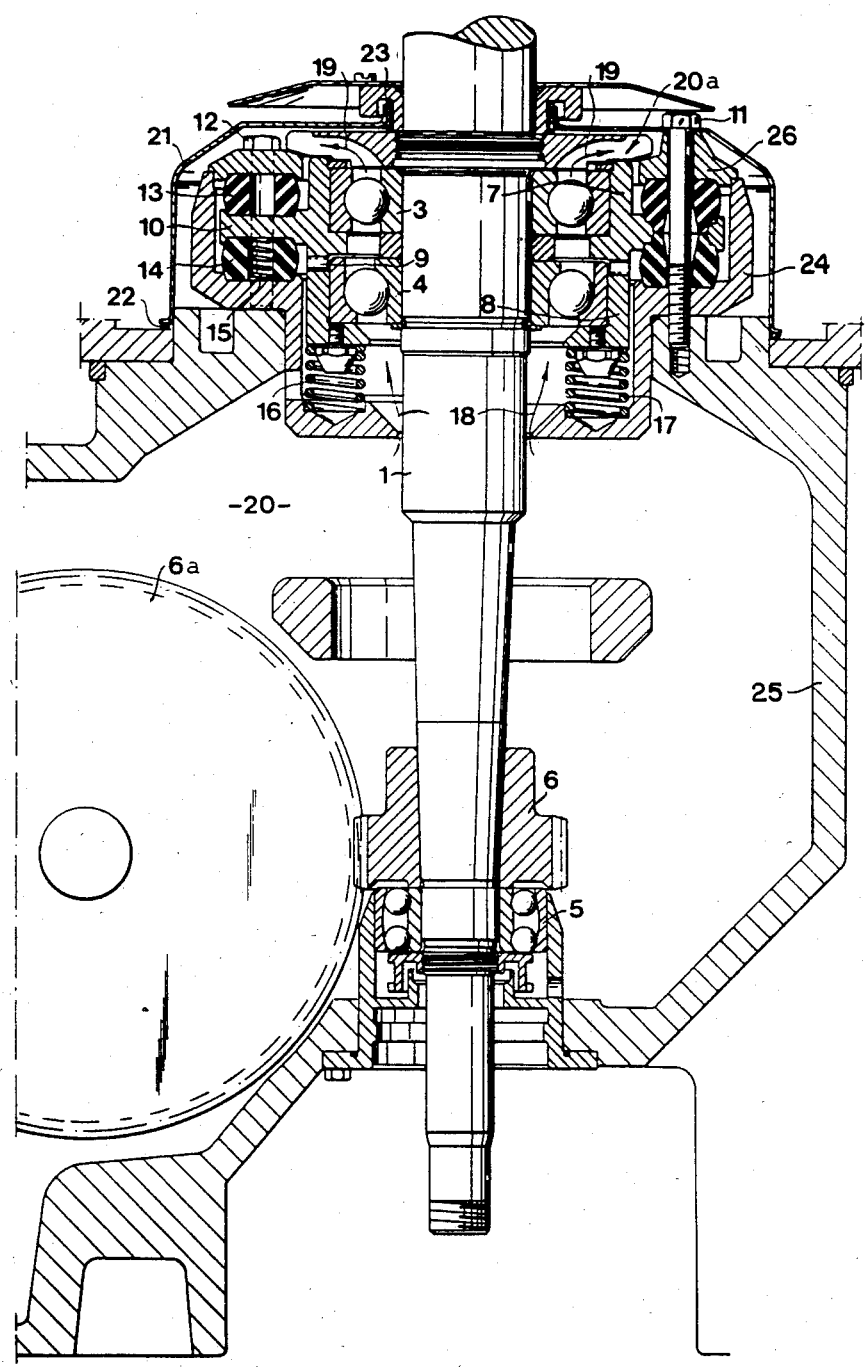

SUSPENSION DEVICE FOR ROTARY SPINDLE

The present invention relates to a suspension device for rotary spindles which comprises a bearing housing enclosing two closely adjacent bearings, one of which is arranged to transfer axial forces and the other of which is arranged to transfer radial forces, said bearing housing being resiliently suspended in a frame so that it has a certain freedom of movement relative to the frame both radially and axially.

Suspension devices of this kind are used, for instance, in connection with certain centrifugal separators having a rotor which is mounted at the upper part of a vertical rotatable spindle. The bearing housing is situated just below the rotor at the upper end of the spindle. The spindle is also journalled at its lower part in a spherical ball bearing.

Spindles of this kind are subjected to substantial forces, since a centrifuge rotor may weigh as much as 1000 kg and rotate with a speed of 5000 rpm. Therefore, it is important that the operating conditions for the bearings are the best possible so that no unnecessary heat development occurs. The bearings are lubricated during the operation of the centrifugal separator by an oil mist caused to flow axially through the bearing housing. The oil mist is sucked from below through the bearing housing by means of a fan operated by rotation of the spindle.

In spite of an effective lubrication of the bearings in the above-described manner, undesired heat development and vibrations arise in the bearing housing, giving the whole suspension device, in certain cases, a very limited lifetime.

The principal object of the present invention is to provide better operating conditions and increased lifetime for suspension devices of the kind here described.

This object is achieved, according to the invention, by having the bearing housing divided into two parts each enclosing one of said bearings, first spring means being arranged to transfer radial forces between the frame and the part of the bearing housing which encloses the radial bearing, whereas second spring means are arranged to transfer axial forces between the frame and the part of the bearing housing which encloses the axial bearing, and by having the parts of the bearing housing free to perform angular movements relative to each other around axes perpendicular to the spindle but arranged in such engagement with each other that they are prevented from moving relative to each other in the peripheral direction of the spindle.

By such an arrangement, the outer races of the two bearings may take various angular positions relative to each other without being prevented from doing so by an unresilient bearing housing. Thus, they may take the same angular positions as the inner races of the bearings, which are united each with one part of the spindle and therefore follow the relative movements of these spindle parts when the spindle bends. It is true that the bending of the spindle is extremely small in the limited area between the bearings, but in spite of this the present invention has proved to give a substantially improved bearing function. Thus, it has been possible to reduce substantially the initially mentioned problems with vibrations and undesired heat development.

The invention is described in more detail below with reference to the accompanying drawing, in which the single illustration is a longitudinal section through a suspension device for a centrifugal separator spindle.

In a centrifugal separator, a spindle 1 carrying a separator bowl or rotor is suspended in bearings placed in a bearing housing 7-8. These bearings comprise an upper deep-groove ball bearing 3 and a lower angular contact ball bearing 4. The lower end of the spindle is journalled in a spherical ball bearing 5. The centrifuge rotor is caused to rotate by means of a driving device (not shown). A gear wheel 6 connected with the spindle is engaged by a gear wheel 6a connected with a fly wheel, said gear wheels being driven by said driving device.

The bearing housing consists of an upper housing part 7 and a lower housing part 8, which engage each other by a so-called claw clutch 9. A claw clutch means that the edges of the annular parts of the bearing housing which face each other have teeth which are distributed around their periphery and which engage each other with a predetermined clearance, so that there is a certain freedom of movement between the bearing housing parts, the latter still providing a common bearing housing in which the two bearings are housed. The clutch shown and described is only a preferred embodiment. Other clutches can be used to perform the same function, i. e., to constitute means for preventing housing parts 7 and 8 from moving substantially relative to each other in the peripheral direction of the spindle.

The upper housing part 7 has an annular flange 10 which, by means of bolts 11, 12 distributed around the periphery, is resiliently suspended between squeezed, preferably annular, rubber bushings 13 and 14, respectively, or similar spring means. These rubber bushings 13 and 14 are rings surrounding the spindle and dimensioned to transfer substantially all of the radial force which the spindle may exert on the frame during operation. In the lower rubber bushing 14 there are compressed coil springs 15 arranged in holes of the bushing, distributed around the periphery. These coil springs 15 are intended to transfer a small part of the axial force to be transferred from the spindle to the frame, i.e., the part which the ball bearing 3 is supposed to transfer. Due to the coil springs 15, the lower rubber bushing 14 is prevented from being compressed substantially to a larger degree than the upper rubber bushing 13.

The lower bearing housing part 8 resiliently rests upon coil springs 16, 17 distributed around the periphery, or similar spring means, which are dimensioned to support the greater part of the weight of the spindle and the centrifuge rotor mounted thereon.

By rotation of the spindle 1, a stream of air is created through the bearing housing in a direction shown by arrows 18, 19, said stream of air entraining an oil mist which is present in a chamber 20 and thereby lubricating the bearings 3, 4. This stream of air is created by a fan 20a mounted at the upper side of the bearing housing part 7. To prevent the oil mist from being sucked out past a cap 21 arranged above the suspension device, an O-ring gasket 22 is mounted at the lower edge of the cap, and a nylon ring gasket 23 is arranged at the upper edge of the cap. Oil that has been used in the bearings 3, 4 may run out of the bearing housing through the slot formed by the claw clutch 9 between the bearing housing parts 7, 8. The bearing housing is thus self-cleaning with respect to already used oil.

As shown, housing 7-8 is mounted in an annular frame part 24 seated on the centrifuge frame 25 and having a reduced lower portion fitted closely in an opening of the frame, where the receptacle is held by bolts 11, there being an annular clearance space between housing parts 7-8 and the surrounding frame part 24. Bushings 14 and coil springs 16-17 are seated on the bottom of the frame part. A ring 26 engages the upper end of bushings 13 and the upper edge of frame part 24, where it is held by bolts 11-12.

In the suspension device shown in the drawing, the whole bearing housing 7, 8 is allowed to move radially as well as axially when the spindle 1 bends. Also, the bearing housing parts 7 and 8 are allowed to move relative to each other so that the outer as well as the inner races of both bearings 3, 4 may follow each angular change of the spindle when it is bending.

The suspension device described above and shown in the drawing, of course, may be used in other connections than in a centrifugal separator. Further, the present invention is not limited to the embodiment shown in the drawing but may be modified within the scope of the appended claims.

We claim:

1. In combination with a frame and a rotary spindle having an axis, a device for suspending the spindle on the frame and comprising two separate but closely adjacent bearings surrounding different portions of the spindle, said bearings being an axial bearing and a radial bearing, respectively, a bearing housing divided into two rigid and relatively movable parts enclosing said axial and radial bearings, respectively, first spring means through which radial forces are transmitted to the frame from said housing part enclosing the radial bearing, and second spring means through which axial forces are transmitted to the frame from said housing part enclosing the axial bearing, said housing parts including means through which said parts engage each other to prevent movement of each part relative to the other in the peripheral direction of the spindle, said means being operable to allow free angular movements of the housing parts relative to each other around axes perpendicular to the spindle axis.

2. The combination of claim 1, in which said preventing means are a clutch having interengaging teeth on the two housing parts, respectively.

3. The combination of claim 1, in which said housing part enclosing the radial bearing has a circumferential flange resiliently suspended in the frame both radially and axially by said first spring means, said second spring means being vertically acting springs spaced around the spindle and through which said housing part enclosing the axial bearing is supported by the frame.

4. The combination of claim 3, in which said first spring means include upper and lower rubber rings surrounding the spindle and between which said circumferential flange is supported, said lower ring having recesses, the combination comprising also spring means enclosed in said recesses and extending from said flange to a frame part supporting the lower ring.

5. The combination of claim 1, comprising also a third bearing for the spindle surrounding a portion thereof remote from said closely adjacent bearings and secured to said frame.

6. The combination of claim 5, in which said third bearing is at the lower part of the spindle.

* * * * *